(12) United States Patent
Usui et al.

(10) Patent No.: US 12,738,588 B2
(45) Date of Patent: Sep. 15, 2026

(54) BATTERY MODULE

(71) Applicant: HONDA MOTOR CO., LTD., Tokyo (JP)

(72) Inventors: Hidemasa Usui, Saitama (JP); Yosuke Yoshizawa, Saitama (JP); Masanari Higuchi, Saitama (JP)

(73) Assignee: HONDA MOTOR CO., LTD, Tokyo (JP)

(*) Notice: Subject to any disclaimer, the term of this patent is extended or adjusted under 35 U.S.C. 154(b) by 485 days.

(21) Appl. No.: 18/499,236

(22) Filed: Nov. 1, 2023

(65) Prior Publication Data

US 2024/0204334 A1 Jun. 20, 2024

(30) Foreign Application Priority Data

Dec. 20, 2022 (JP) ................................ 2022-203305

(51) Int. Cl.

*H01M 50/291* (2021.01)
*H01M 10/04* (2006.01)
*H01M 10/0585* (2010.01)
*H01M 50/204* (2021.01)

(52) U.S. Cl.

CPC ..... *H01M 50/291* (2021.01); *H01M 10/0481* (2013.01); *H01M 10/0585* (2013.01); *H01M 50/204* (2021.01)

(58) Field of Classification Search

CPC ................................................ H01M 10/0481
See application file for complete search history.

(56) References Cited

U.S. PATENT DOCUMENTS

2020/0075987 A1 3/2020 Torres Martinez
2021/0194048 A1 6/2021 Taniuchi et al.
2023/0268587 A1* 8/2023 Thurmeier ........ H01M 10/0525

FOREIGN PATENT DOCUMENTS

EP 3886202 A1 9/2021
JP 2020064848 A 4/2020
JP 2021096974 A 6/2021

* cited by examiner

*Primary Examiner* — Brian R Ohara
(74) *Attorney, Agent, or Firm* — CKC & PARTNERS CO. LLC

(57) ABSTRACT

A battery module according to the present invention includes: a cell stack including a plurality of battery cells that are stacked; a pair of end plates disposed at opposite ends of the cell stack in a stacking direction of the cell stack; and a buffer interposed at least between the battery cells or between the battery cell and the end plate, the buffer comprising an outer frame-forming elastic member, a separating elastic member disposed to surround a central portion of the outer frame-forming elastic member, a compressible fluid filling an interior of the separating elastic member, and a liquid filling an exterior of the separating elastic member.

7 Claims, 5 Drawing Sheets

BATTERY MODULE

This application is based on and claims the benefit of priority from Japanese Patent Application No. 2022-203305, filed on 20 Dec. 2022, the content of which is incorporated herein by reference.

BACKGROUND OF THE INVENTION

Field of the Invention

The present invention relates to a battery module.

Related Art

In recent years, research and development of battery modules that contribute to energy efficiency has been carried out in order to ensure many people have access to affordable, reliable, sustainable, and advanced energy. A battery module is produced by combining and modularizing a plurality of battery cells, and generally includes a cell stack formed by stacking the plurality of battery cells, and a pair of end plates disposed at opposite ends of the cell stack in the stacking direction of the cell stack. The battery module is used for applications requiring a large current and a high voltage, such as driving a motor of an electric vehicle and a motor of a hybrid electric vehicle.

For the battery module, it has been under consideration to apply a pressure in the stacking direction of the battery cells by interposing a buffer between battery cells or between the cell stack and the end plate. Known examples of the buffer include a buffer having a deformable chamber and a system for supplying a fluid for deforming the chamber (Patent Document 1), and elastic spring members such as a leaf spring and a fluid spring (Patent Documents 2 and 3).

Patent Document 1: Japanese Unexamined Patent Application, Publication No. 2020-64848

Patent Document 2: Japanese Unexamined Patent Application, Publication No. 2021-96974

Patent Document 3: European Patent Application, Publication No. 3886202

SUMMARY OF THE INVENTION

For the techniques relating to battery cells and battery modules, it is a challenge to achieve an increase in the electric capacity. In order to increase the electric capacity of a battery cell, it is being researched to use a lithium metal or a metal that forms an alloy with lithium, such as silicon (Si), as a negative electrode active material. However, a battery cell (lithium secondary battery) including a negative electrode containing a lithium metal or a metal that forms an alloy with lithium experiences large changes in the volume thereof due to charge and discharge because the volume of the negative electrode increases significantly during charge and decreases significantly during discharge. On the other hand, it is preferable that the battery module is capable of applying a uniform and constant pressure to the battery cells included therein regardless of whether the battery cells are in the charging state or the discharging state. For this reason, there is a demand for a buffer that contracts to absorb an increase in the volume of a battery cell during charge and restores the original shape in accordance with a decrease in the volume of the battery cell during discharge. However, conventional buffers have insufficient resilience after contraction, and therefore, it is difficult for the conventional buffers to apply a uniform and constant pressure to battery cells that significantly change in volume due to charge and discharge.

The present invention has been made to address the above-described disadvantage, and an object of the present invention is to provide a battery module capable of efficiently applying a uniform and constant pressure to battery cells regardless of whether the battery cells are in the charging state or the discharging state. The present invention contributes to energy efficiency, by extension.

The present inventors have made the present invention based on their findings that the above object can be achieved by using a buffer including an outer frame-forming elastic member, a separating elastic member disposed to surround a central portion of the outer frame-forming elastic member, a compressible fluid filling an interior of the separating elastic member, and a liquid filling an exterior of the separating elastic member, or a buffer including an outer frame-forming elastic member, an inner frame-forming elastic member accommodated in the outer frame-forming elastic member, a compressible fluid filling the inner frame-forming elastic member, and a liquid filling a space between the outer frame-forming elastic member and the inner frame-forming elastic member. Thus, the present invention provides a battery module according to the following first to seventh aspects.

A battery module according to the first aspect includes:

a cell stack including a plurality of battery cells that are stacked;

a pair of end plates disposed at opposite ends of the cell stack in a stacking direction of the cell stack; and a buffer interposed at least between the battery cells or between the battery cell and the end plate. The buffer includes an outer frame-forming elastic member, a separating elastic member disposed to surround a central portion of the outer frame-forming elastic member, a compressible fluid filling an interior of the separating elastic member, and a liquid filling an exterior of the separating elastic member.

In the battery module according to the first aspect, when the volume of the battery cells increases, the liquid filling the outer frame-forming elastic member pressurizes the separating elastic member and the outer frame-forming elastic member in a direction orthogonal to the stacking direction of the cell stack. As a result, the compressible fluid is compressed in the direction orthogonal to the stacking direction of the cell stack, the outer frame-forming elastic member is expanded in the direction orthogonal to the stacking direction of the cell stack, and the buffer contracts in the stacking direction of the cell stack.

The compressible fluid that has been compressed and the outer frame-forming elastic member that has been expanded tend to recover their original shapes in response to release from the pressure applied by the liquid. Therefore, when the volume of the battery cells decreases after the increase, the buffer tends to restore its original state. Since the compressible fluid and the liquid both have fluidity, the buffer has a uniform internal pressure. Furthermore, since the compressible fluid fills the interior of the separating elastic member, and the liquid fills the exterior of the separating elastic member, it is unlikely for the compressible fluid to flow to the outside. Therefore, the battery module according to the first aspect can efficiently apply a uniform and constant pressure to the battery cells regardless of whether the battery cells are in the charging state or the discharging state.

The second aspect is an embodiment of the first aspect. In the battery module according to the second aspect, the separating elastic member has a lower hardness than the outer frame-forming elastic member.

In the battery module according to the second aspect, since the separating elastic member is more deformable than the outer frame-forming elastic member, when the separating elastic member and the outer frame-forming elastic member are pressurized by the liquid, compression of the compressible fluid is more likely to occur than the expansion of the outer frame-forming elastic member.

The third aspect is an embodiment of the first or second aspect. In the battery module according to the third aspect, the separating elastic member is disposed obliquely with respect to the stacking direction of the cell stack.

In the battery module according to the third aspect, the separating elastic member has a larger area than in the case where the separating elastic member is disposed parallel to the stacking direction of the cell stack. Therefore, when the separating elastic member is pressurized by the liquid, the compressible fluid is compressed further easily. Furthermore, since the outer frame-forming elastic member is in contact with the separating elastic member in a large contact area, the bonding strength between the outer frame-forming elastic member and the separating elastic member increases, and it is unlikely for the outer frame-forming elastic member and the separating elastic member to be peeled off, thereby improving the durability.

The fourth aspect is an embodiment of any one of the first to third aspects. In the battery module according to the fourth aspect, the plurality of battery cells each include: an electrode laminate in which a positive electrode layer and a negative electrode layer are laminated via a solid electrolyte layer; and an exterior package that houses the electrode laminate, the negative electrode layer increases in volume during charge and decreases in volume during discharge, the exterior package is expandable and contractible in a laminating direction of the electrode laminate, and the plurality of battery cells are stacked in the laminating direction of the electrode laminate.

In the battery module according to the fourth aspect, each battery cell may include, as a negative electrode active material of the negative electrode layer, a lithium metal or a metal that forms an alloy with lithium. Therefore, the electric capacity of each battery cell increases.

A battery module according to the fifth aspect includes:

- a cell stack including a plurality of battery cells that are stacked;
- a pair of end plates disposed at opposite ends of the cell stack in a stacking direction of the cell stack; and
- a buffer interposed at least between the battery cells or between the battery cell and the end plate. The buffer includes an outer frame-forming elastic member, an inner frame-forming elastic member accommodated inside the outer frame-forming elastic member, a compressible fluid filling the inner frame-forming elastic member, and a liquid filling a space between the outer frame-forming elastic member and the inner frame-forming elastic member.

In the battery cell according to the fifth aspect, when the volume of the battery cells increases, the liquid filling the space between the outer frame-forming elastic member and the inner frame-forming elastic member pressurizes the outer frame-forming elastic member and the inner frame-forming elastic member in a direction orthogonal to the stacking direction of the cell stack. As a result, the compressible fluid is compressed in a direction orthogonal to the stacking direction of the cell stack, the outer frame-forming elastic member is expanded in the direction orthogonal to the stacking direction of the cell stack, and the buffer contracts in the stacking direction of the cell stack. The compressible fluid that has been compressed and the outer frame-forming elastic member that has been expanded tend to recover their original shapes in response to release from the pressure applied by the liquid. Therefore, when the volume of the battery cells decreases after an increase, the buffer tends to restore its original state. Since the compressible fluid and the liquid both have fluidity, the buffer has a uniform internal pressure. Furthermore, since the compressible fluid fills the interior of the inner frame-forming elastic member, and the liquid fills the exterior of the inner frame-forming elastic member, it is unlikely for the compressible fluid to flow to the outside. Therefore, the battery module according to the fifth aspect can efficiently apply a uniform and constant pressure to the battery cells regardless of whether the battery cells are in the charging state or the discharging state.

The sixth aspect is an embodiment of the fifth aspect. In the battery module according to the sixth aspect, the inner frame-forming elastic member has a lower hardness than the outer frame-forming elastic member.

In the battery module according to the sixth aspect, since the inner frame-forming elastic member is more deformable than the outer frame-forming elastic member, when the inner frame-forming elastic member and the outer frame-forming elastic member are pressurized by the liquid, compression of the compressible fluid is more likely to occur than the expansion of the outer frame-forming elastic member.

The seventh aspect is an embodiment of the fifth or sixth aspect. In the battery module according to the seventh aspect, the plurality of battery cells each include: an electrode laminate in which a positive electrode layer and a negative electrode layer are laminated via a solid electrolyte layer; and an exterior package that houses the electrode laminate, the negative electrode layer increases in volume during charge and decreases in volume during discharge, the exterior package is expandable and contractible in a laminating direction of the electrode laminate, and the plurality of battery cells are stacked in the laminating direction of the electrode laminate.

In the battery module according to the seventh aspect, each battery cell may include, as a negative electrode active material of the negative electrode layer, a lithium metal or a metal that forms an alloy with lithium. Therefore, the electric capacity of each battery cell increases.

The present invention provides a battery module capable of efficiently applying a uniform and constant pressure to battery cells regardless of whether the battery cells are in the charging state or the discharging state.

DETAILED DESCRIPTION OF THE INVENTION

Embodiments of the present invention will be described below with reference to the drawings. It should be noted that the following embodiments exemplify the present invention, and are not intended to limit the present invention.

First Embodiment (Battery Module)

Figure 1:
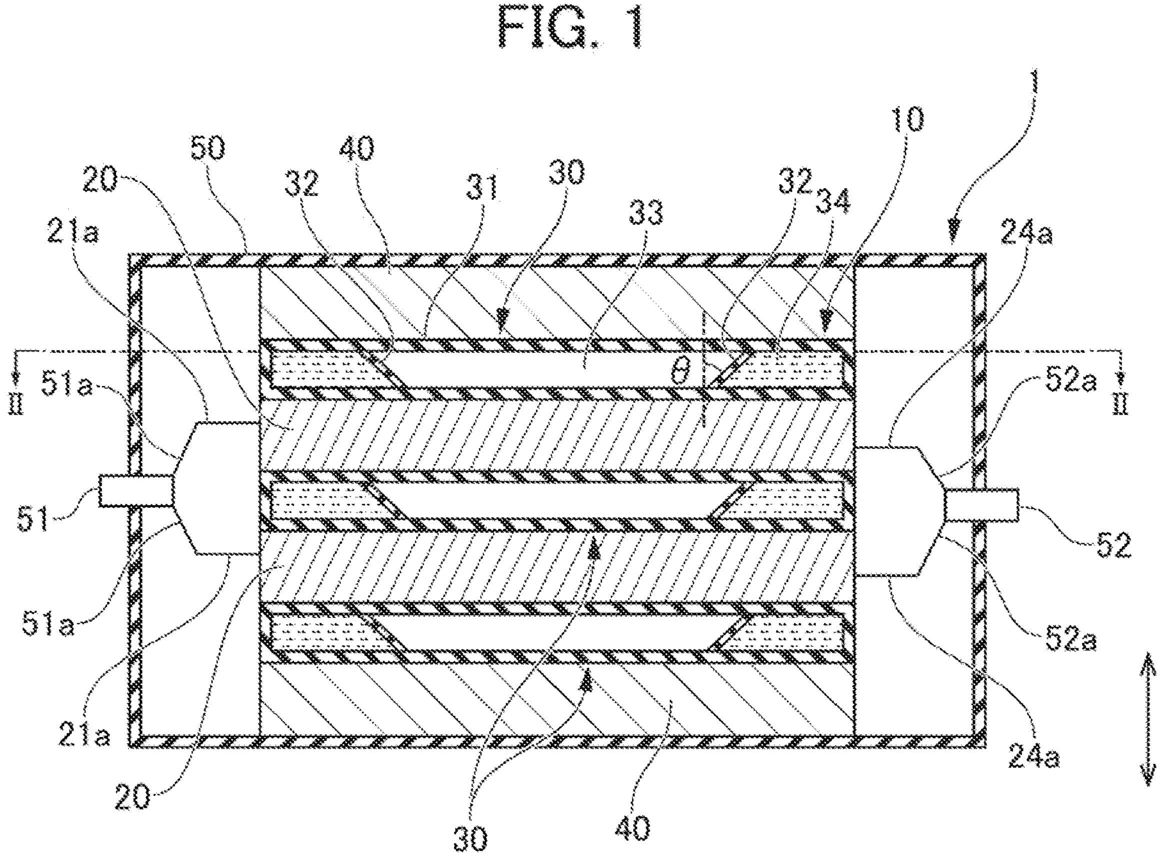
FIG. 1 is a cross-sectional view of a battery module according to a first embodiment of the present invention.
Figure 2:
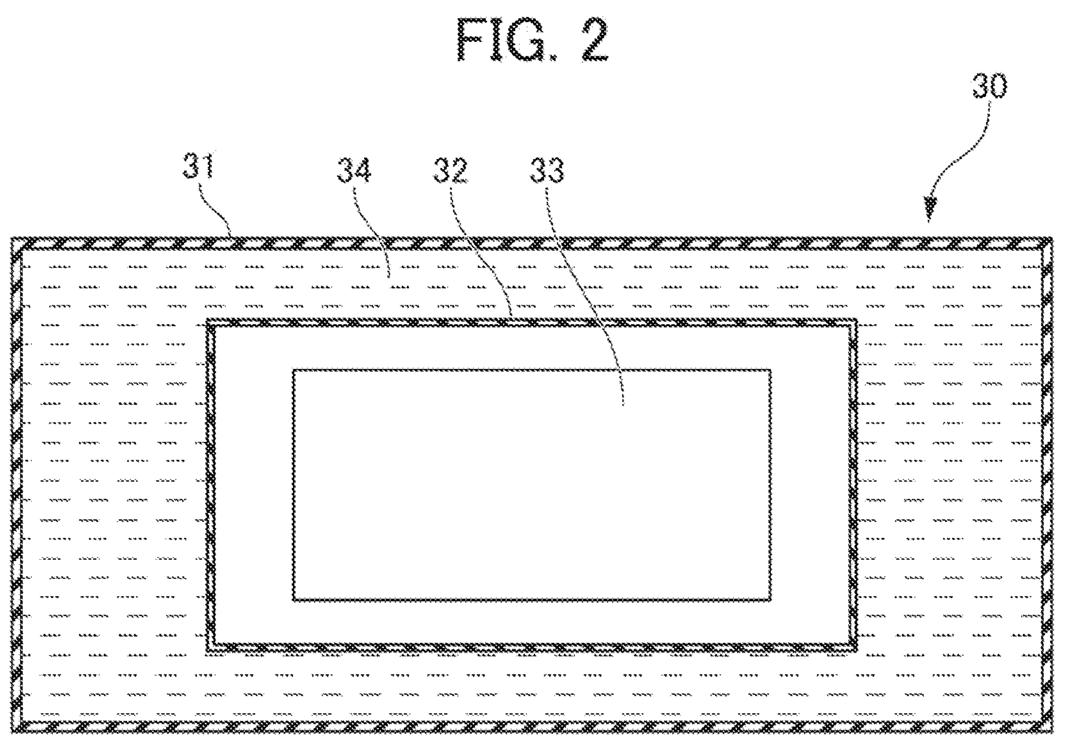
FIG. 2 is a cross-sectional view taken along line II-II of FIG. 1.

As illustrated in FIGS. 1 and 2, a battery module 1 according to the present embodiment includes a cell stack 10. A pair of end plates 40 are disposed at the opposite ends of the cell stack 10 in the stacking direction of the cell stack 10. The cell stack 10 is a stack including a plurality of battery cells 20 and buffers 30 that are stacked in the stacking direction indicated by the arrow in FIG. 1. The buffers 30 are interposed between the battery cells 20 and between the battery cell 20 and each end plate 40. The cell stack 10 and the end plates 40 are housed in a case 50. The case 50 has a negative electrode tab 51 and a positive electrode tab 52. The negative electrode tab 51 is connected to negative electrode terminals 21*a* of the battery cells 20 via lead wires 51*a*. The positive electrode tab 52 is connected to positive electrode terminals 24*a* of the battery cells 20 via lead wires 52*a*.

(Battery Cell)

Figure 3:
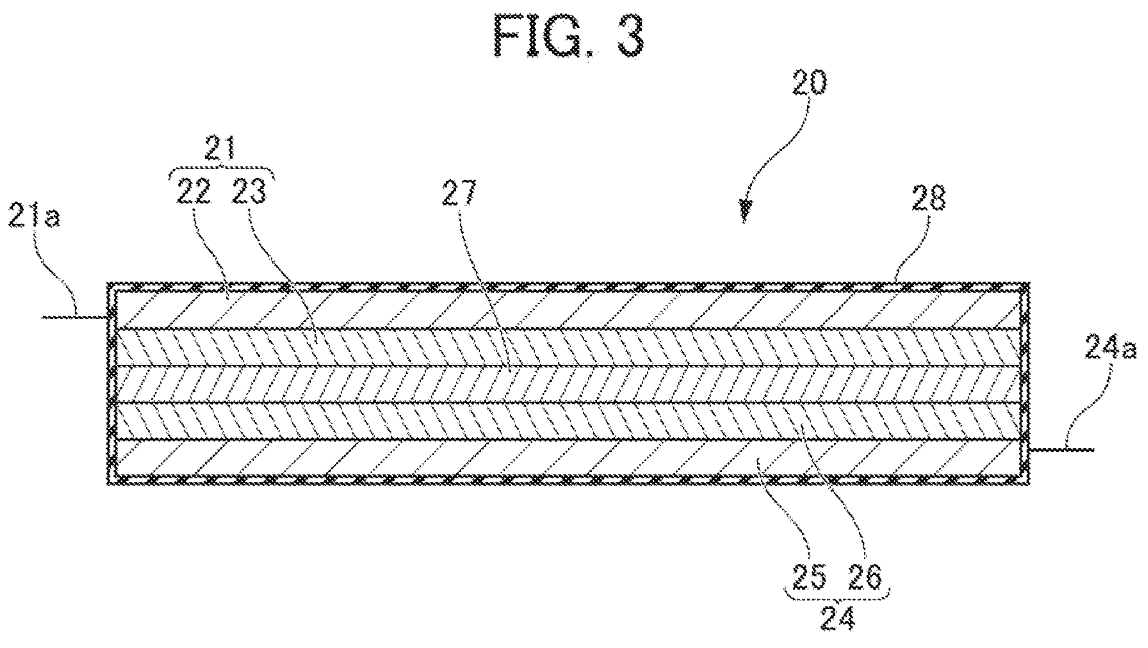
FIG. 3 is a cross-sectional view of a battery cell that can be used in the battery module according to the first embodiment of the present invention.

As illustrated in FIG. 3, each battery cell 20 includes an electrode laminate in which a negative electrode layer 21 and a positive electrode layer 24 are laminated via a solid electrolyte layer 27, and an exterior package 28 in which the electrode laminate is housed. The exterior package 28 is expandable and contractible in the laminating direction of the electrode laminate. The laminating direction in which the electrode layers (negative electrode layer 21 and positive electrode layer 24) of the battery cell 20 are laminated is the same as the stacking direction of the cell stack 10. That is, the plurality of battery cells 20 of the battery module 1 are stacked in the laminating direction of the electrode laminate. Therefore, when the volume of the negative electrode layer 21 or the positive electrode layer 24 increases or decreases due to the charge/discharge of the battery cell 20, the volume of the battery cell 20 increases or decreases in the stacking direction of the cell stack 10. Although the battery cell 20 illustrated in FIG. 3 includes one electrode laminate housed in the exterior package 28, a plurality of electrode laminates may be housed in the exterior package 28.

The negative electrode layer 21 includes a negative electrode current collector 22 and a negative electrode active material layer 23. The negative electrode active material layer 23 is disposed adjacent to the solid electrolyte layer 27. The negative electrode current collector 22 is connected to the negative electrode terminal 21*a*.

The negative electrode current collector 22 is not particularly limited as long as it has a function of collecting electricity of the negative electrode layer 21, and examples of the material for the negative electrode current collector 22 include nickel, copper, and stainless steel. Examples of the shape of the negative electrode current collector include a foil shape and a plate shape. In the present embodiment, the negative electrode layer 21 may include only the negative electrode current collector 22. In this case, during charge, a charge transfer medium (e.g., lithium) is deposited on a surface of the negative electrode current collector 22, whereby the volume of the negative electrode layer 21 increases, and during discharge, the deposited charge transfer medium is dissolved, whereby the volume of the negative electrode layer 21 decreases.

The negative electrode active material layer 23 contains a negative electrode active material as an essential component. The negative electrode active material is not particularly limited as long as it can occlude and release a charge transfer medium. For example, in the case of a lithium ion battery, example of the negative electrode active material include a lithium transition metal oxide such as lithium titanate ($Li_4Ti_5O_{12}$), a transition metal oxide such as $TiO_2$, $Nb_2O_3$, and $WO_3$, a metal sulfide, a metal nitride, a carbon material such as graphite, soft carbon, and hard carbon, metallic lithium, and a metal that forms an alloy with lithium. Examples of the metal that forms an alloy with lithium include Mg, Si, Ag, In, Ge, Sn, Pb, Al, and Zn. The negative electrode active material may be in the form of powder or a thin film. The negative electrode active material layer 23 may contain a conductive auxiliary for improving conductivity, and a binder, in addition to the negative electrode active material. As the conductive auxiliary and the binder, materials generally used in solid-state batteries can be used.

The positive electrode layer 24 includes a positive electrode current collector 25 and a positive electrode active material layer 26. The positive electrode active material layer 26 is disposed adjacent to the solid electrolyte layer 27. The positive electrode current collector 25 is connected to the positive electrode terminal 24*a*.

The positive electrode current collector 25 is not particularly limited as long as it has a function of collecting electricity of the positive electrode layer 24, and examples of the material for the positive electrode current collector 25 include aluminum, aluminum alloy, stainless steel, nickel, iron, and titanium, among which aluminum, aluminum alloy, and stainless steel are preferred. Examples of the shape of the positive electrode current collector 25 include a foil shape and a plate shape.

The positive electrode active material layer 26 contains at least a positive electrode active material. The positive electrode active material contained in the positive electrode active material layer 26 is not particularly limited and may be the same as that used for a positive electrode layer of a general solid-state battery. In the case of a lithium ion battery, examples of the positive electrode active material include a layered active material containing lithium, a spinel active material, and an olivine active material. Specific examples of the positive electrode active material include lithium cobaltate ($LiCoO_2$), lithium nickelate ($LiNiO_2$), $LiNi_pMn_qCo_rO_2$ (p+q+r=1), $LiNi_pAl_qCo_rO_2$ (p+q+r=1), lithium manganate ($LiMn_2O_4$), Li—Mn spinel represented by $Li_{1+x}Mn_{2-x-y}M_yO_4$ (where X+y=2, and M is at least one selected from Al, Mg, Co, Fe, Ni, or Zn), lithium titanate (an oxide containing Li and Ti), and lithium metal phosphate ($LiMPO_4$, where M is at least one selected from Fe, Mn, Co, or Ni). The positive electrode active material layer 26 may optionally contain a solid electrolyte, from the viewpoint of improving charge transfer medium conductivity. The positive electrode active material layer 26 may further contain a binder, a conductive auxiliary, and the like. As these substances, those generally used in solid-state batteries can be used.

The solid electrolyte layer 27 contains at least a solid electrolyte material. The charge transfer medium is conducted between the positive electrode active material and the negative electrode active material through the solid electrolyte material contained in the solid electrolyte layer 27. The solid electrolyte material is not particularly limited as long as it has charge transfer medium conductivity, i.e., ion conductivity, and examples thereof include a sulfide solid electrolyte material, an oxide solid electrolyte material, a nitride solid electrolyte material, and a halide solid electrolyte material. Examples of the sulfide solid electrolyte material include $Li_2S—P_2S_5$ and $Li_2S—P_2S_5—LiI$ in the case of a lithium ion battery, for example. The description of "$Li_2S—P_2S_5$" means a sulfide solid electrolyte material including a raw material composition containing $Li_2S$ and $P_2S_5$. Examples of the oxide solid electrolyte material include an NASICON type solid electrolyte, a garnet type solid electrolyte, and a perovskite type solid electrolyte in the case of a lithium ion battery, for example. Examples of the NASICON type solid electrolyte include oxides containing Li, Al, Ti, P, and O (e.g., $Li_{1.5}Al_{0.5}Ti_{1.5}(PO_4)_3$). Examples of the garnet type solid electrolyte include oxides containing Li, La, Zr, and O (e.g., $Li_7La_3Zr_2O_{12}$). Examples of the perovskite type solid electrolyte include oxides containing Li, La, Ti, and O (e.g., $LiLaTiO_3$).

The exterior package 28 is not particularly limited as long as it can house the electrode laminate, and a laminate film can be used as the material for the exterior package 28, for example. The laminate film has a multilayer structure in which a layer of a heat-sealable resin such as polyolefin or the like is laminated on a surface of a metal layer made of aluminum, stainless steel (SUS), or the like. For example, the laminate film may include, in addition to the foregoing, a layer made of polyamide such as nylon or the like, a layer made of polyester such as polyethylene terephthalate or the like, an adhesive layer made of an arbitrary laminate adhesive or the like.

(Buffer)

The buffer 30 has an action of uniformizing a surface pressure applied to the battery cells 20. The surface pressure applied to the battery cell 20 is, for example, 1 MPa or greater.

As illustrated in FIGS. 1 and 2, each buffer 30 includes an outer frame-forming elastic member 31 and a separating elastic member 32 that is disposed to surround a central portion of an interior of the outer frame-forming elastic member 31. An interior of the separating elastic member 32 is filled with a compressible fluid 33. An exterior of the separating elastic member 32 is filled with a liquid 34.

The outer frame-forming elastic member 31 is a hollow member having a substantially rectangular parallelepiped shape. The outer frame-forming elastic member 31 has a hardness that allows the outer frame-forming elastic member 31 to deform in accordance with an increase in the volume of the battery cells 20. The hardness of the outer frame-forming elastic member 31 is equal to or greater than the hardness of the separating elastic member 32. For example, the outer frame-forming elastic member 31 has durometer A hardness of 70 or greater. The material for the outer frame-forming elastic member 31 is not limited as long as it is elastic, and examples of the material include rubber, an elastomer, and an elastic resin. Examples of the rubber include ethylene-propylene rubber, nitrile rubber, fluorine rubber, chloroprene rubber, and urethane rubber. Examples of the elastomer include a styrene elastomer and an olefin elastomer. Examples of the elastic resin include polypropylene and polyamide.

The separating elastic member 32 is bonded to the inner surface of the outer frame-forming elastic member 31. The separating elastic member 32 can be bonded by, for example, various methods used as methods of bonding an elastic member, such as adhesion and welding. The hardness of the separating elastic member 32 is not particularly limited, but is preferably lower than that of the outer frame-forming elastic member 31. For example, the separating elastic member 32 has a durometer A hardness less than 70, preferably of 30 or less. From the viewpoint of reducing the pressure difference between the portion filled with the liquid and the portion filled with the compressible fluid, the durometer A hardness of the separating elastic member 32 may be, for example, 50 or less when the durometer A hardness of the outer frame-forming elastic member 31 is defined as 100. The material for the separating elastic member 32 is not limited as long as it is elastic, and examples of the material include, rubber, an elastomer, and an elastic resin. Examples of the rubber, the elastomer, and the elastic resin are the same as those of the outer frame-forming elastic member 31.

As illustrated in FIG. 1, the separating elastic member 32 may be disposed obliquely with respect to the stacking direction of the cell stack 10. The angle (θ in FIG. 1) at which the separating elastic member 32 is disposed with respect to the stacking direction of the cell stack is, for example, 60 degrees or greater.

The compressible fluid 33 is preferably, but not limited to, nitrogen gas from the viewpoint of safety and reduction of an amount of the compressible fluid 33 that may permeate through the buffer to exist to the outside. As the liquid 34, for example, a mineral hydraulic fluid, a phosphate hydraulic fluid, water, or a glycol solvent can be used. The ratio between the compressible fluid 33 and the liquid 34, which fill the interior of the outer frame-forming elastic member 31, is within the range of, for example, 5:5 to 9:1 in volume ratio. An increase in the ratio of the compressible fluid 33 suppresses an increase in internal pressure when the buffer 30 is compressed. As a result, the pressure load on the end plates 40 is reduced, thereby alleviating the problem of increasing the rigidity of the entire battery module 1. If the amount of the compressible fluid 33 is excessively reduced, an increased amount of the compressible fluid 33 may permeate through the buffer 30 to exit to the outside.

(End Plates)

The end plates 40 act to restrain the cell stack 10 in the stacking direction. The surface pressure applied to the cell stack 10 by the buffers 30 can be adjusted by means of the restraint force of the end plates 40. The material for the end plates 40 is not particularly limited, and various materials used as the end plates for battery modules can be used.

(Case)

The case 50 houses the cell stack 10 and the end plates 40. A space may be provided between the inner surface of the case 50 and a side surface of the cell stack 10. When the volume of the battery cells 20 increases, the thus provided space allows the outer frame-forming elastic members 31 to easily expand in a direction orthogonal to the stacking direction of the cell stack 10. The material for the case 50 is not particularly limited, and various materials used as battery module cases can be employed as the material for the case 50.

(Operation of Buffer)

Figure 4:
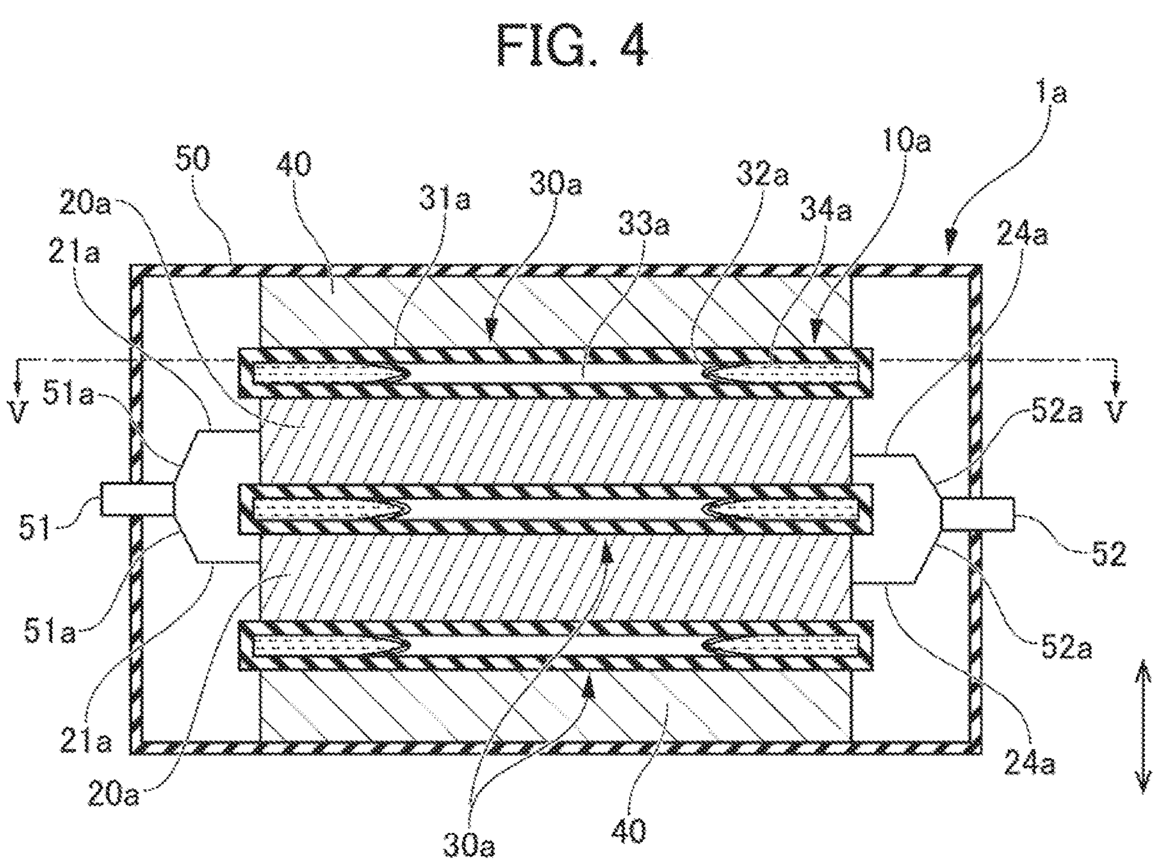
FIG. 4 is a cross-sectional view illustrating a state in which the battery cells in the battery module according to the first embodiment of the present invention have an increased volume.
Figure 5:
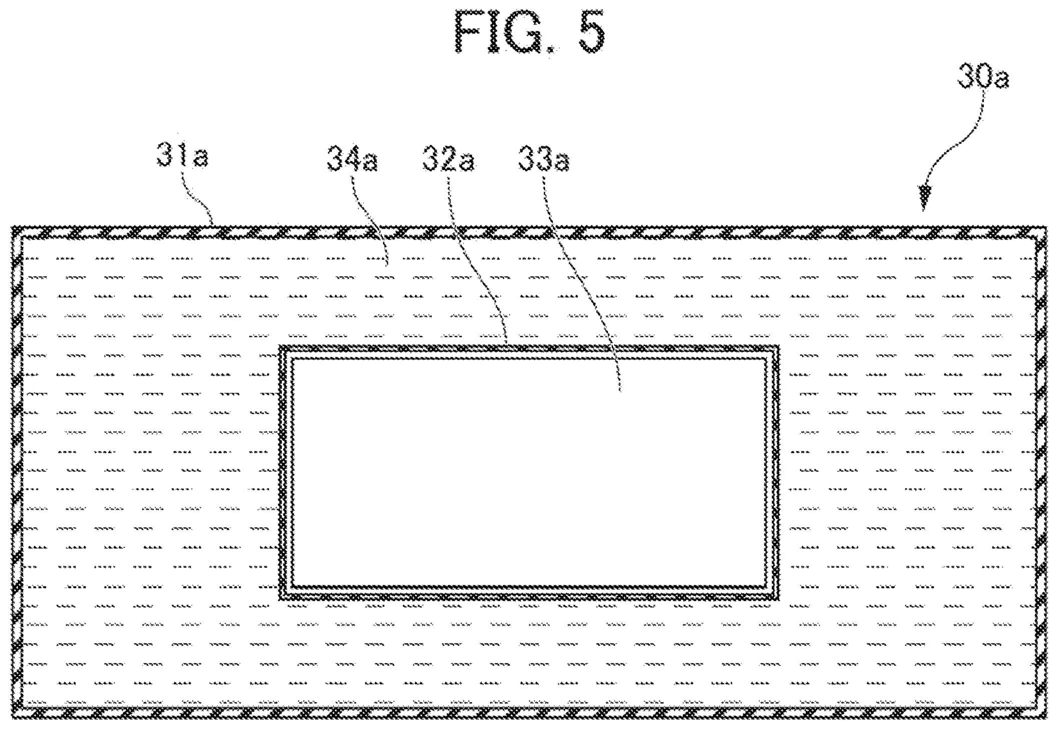
FIG. 5 is a cross-sectional view taken along line V-V of FIG. 4.

Next, an operation that the buffers 30 perform when the volume of the battery cells 20 in the battery module 1 increases will be described with reference to FIGS. 4 and 5. As illustrated in FIGS. 4 and 5, in the battery module 1*a* in which the battery cells 20*a* have an increased volume, the buffers 30*a* in the cell stack 10*a* are pressurized in the stacking direction of the cell stack 10*a* by the battery cells 20*a* having the increased volume, and as a result, the outer frame-forming elastic member 31*a* of each buffer 30*a* is crushed in the stacking direction of the cell stack 10*a* and becomes thin. When the thickness of the outer frame-forming elastic member 31*a* decreases, the pressure of the liquid 34*a* filling the outer frame-forming elastic member 31*a* rises. The liquid 34*a* having the increased pressure pressurizes the separating elastic member 32*a* and the outer frame-forming elastic member 31*a* in a direction orthogonal to the stacking direction of the cell stack 10*a*. As a result, the compressible fluid 33*a* is compressed in the direction orthogonal to the stacking direction of the cell stack 10*a*, and the outer frame-forming elastic member 31*a* is expanded in the direction orthogonal to the stacking direction of the cell stack 10. The amounts of the compressible fluid 33*a* and the liquid 34*a* in the buffers 30*a* are adjusted such that the buffers 30*a* interposed between the battery cells 20*a* and the buffers 30*a* interposed between the battery cell 20*a* and the end plates 40 are expanded in the same amount in the direction orthogonal to the stacking direction of the cell stack 10*a*.

In a case where the separating elastic member 32*a* has a lower hardness and is more deformable than the outer frame-forming elastic member 31*a*, a pressure is easily transmitted to the compressible fluid 33*a* filling the interior of the separating elastic member 32*a*. Therefore, the compressible fluid 33*a* tends to be compressed. Since the outer frame-forming elastic member 31*a* is expanded in the direction orthogonal to the stacking direction of the cell stack 10 as the compressible fluid 33*a* is compressed, an increase in the surface pressure due to excessive compression of the compressible fluid 33*a* is alleviated.

In the battery module 1 of the present embodiment having the configuration described above, when the volume of the battery cells 20 increases, the compressible fluid 33 in each buffer 30 is compressed in a direction orthogonal to the stacking direction of the cell stack 10 due to the pressure applied by the liquid 34 filling the outer frame-forming elastic member 31, and the outer frame-forming elastic member 31 is expanded in the direction orthogonal to the stacking direction of the cell stack 10, whereby the buffer 30 contracts in the stacking direction of the cell stack 10. The compressible fluid 33 that has been compressed and the outer frame-forming elastic member 31 that has been expanded tend to recover their original shapes in response to release from the pressure applied by the liquid 34. Therefore, when the volume of the battery cells 20 decreases after an increase, the buffers 30 tend to restore their original states. Since the compressible fluid 33 and the liquid 34 both have fluidity, each buffer 30 has a uniform internal pressure. Furthermore, since the compressible fluid 33 fills the interior of the separating elastic member 32, and the liquid 34 fills the exterior of the separating elastic member 32, i.e., since the compressible fluid 33 is surrounded by the liquid 34, it is unlikely for the compressible fluid 33 to flow to the outside. Therefore, the battery module 1 of the present embodiment can efficiently apply a uniform and constant pressure to the battery cells 20 regardless of whether the battery cells 20 are in the charging state or the discharging state.

In the battery module 1 of the present embodiment, in a case where the separating elastic member 32 has a lower hardness than the outer frame-forming elastic member 31, when the separating elastic member 32 and the outer frame-forming elastic member 31 are pressurized by the liquid 34, compression of the compressible fluid 33 is more likely to occur than the expansion of the outer frame-forming elastic member 31. When the compressible fluid 33 is apt to be compressed, the internal pressure of the buffer 30, that is, the pressure of the compressible fluid 33 and that of the liquid 34 can be increased. Such an increase in the internal pressure of the buffer 30 makes it easy for the buffer 30 to restore the original shape upon release from the pressure applied by the liquid 34.

In the battery module 1 of the present embodiment, the separating elastic member 32 disposed obliquely with respect to the stacking direction of the cell stack 10 has a larger area than in the case where the separating elastic member 32 is disposed parallel to the stacking direction of the cell stack 10. Therefore, when the separating elastic member 32 is pressurized by the liquid 34, the compressible fluid 33 is compressed further easily. Furthermore, since the outer frame-forming elastic member 31 is in contact with the separating elastic member 32 in a large contact area, the bonding strength between the outer frame-forming elastic member 31 and the separating elastic member 32 increases, and it is unlikely for the outer frame-forming elastic member 31 and the separating elastic member 32 to be peeled off, thereby improving the durability.

In the battery module 1 of the present embodiment, each battery cell 20 may include, as the negative electrode active material layer 23 of the negative electrode layer 21, a lithium metal or a metal that forms an alloy with lithium. Therefore, the electric capacity of each battery cell 20 increases.

Second Embodiment (Battery Module)

Figure 6:
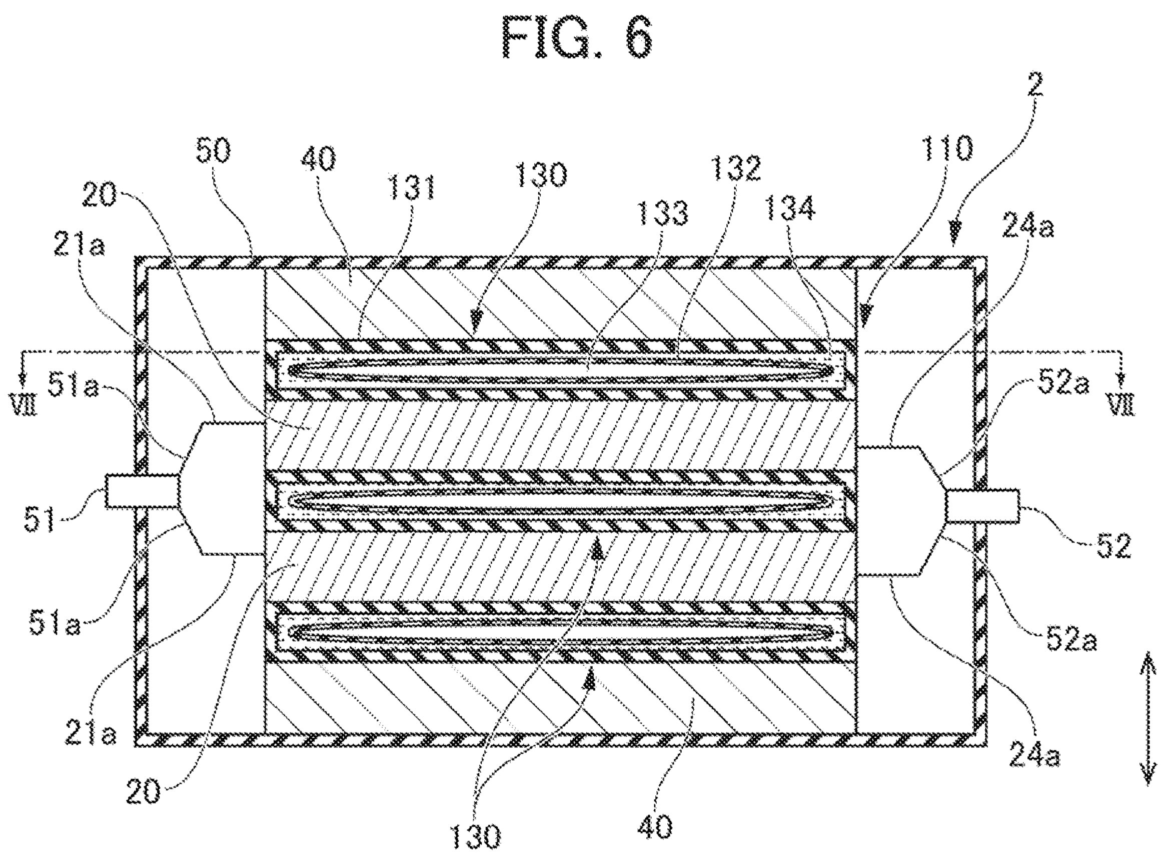
FIG. 6 is a cross-sectional view of a battery module according to a second embodiment of the present invention.
Figure 7:
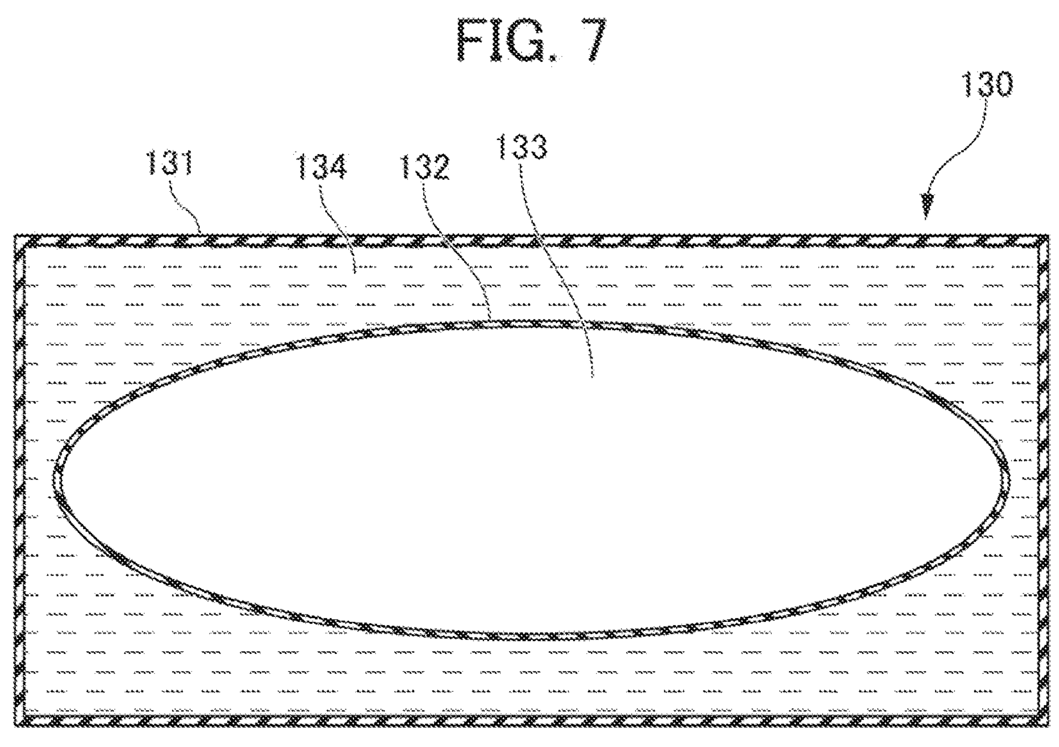
FIG. 7 is a cross-sectional view taken along line VII-VII of FIG. 6.

As illustrated in FIGS. 6 and 7, a battery module 2 according to a second embodiment includes buffers 130 interposed between battery cells 20 forming a cell stack 110 and between the battery cell 20 and end plates 40. The battery module 2 of the present embodiment has the same configuration as that of the battery module 1 of the first embodiment, except for the configuration of the buffer 130. Therefore, in the description of the second embodiment, the same components as those of the first embodiment are denoted by the same reference signs, and the description thereof will be omitted.

(Buffer)

Each buffer 130 includes an outer frame-forming elastic member 131 and an inner frame-forming elastic member 132 accommodated inside the outer frame-forming elastic member 131. The inner frame-forming elastic member 132 is filled with a compressible fluid 133. A space between the outer frame-forming elastic member 131 and the inner frame-forming elastic member 132 is filled with a liquid 134.

The outer frame-forming elastic member 131 is a hollow member having a substantially rectangular parallelepiped shape. The outer frame-forming elastic member 131 has a hardness that allows the outer frame-forming elastic member 131 to deform in accordance with an increase in the volume of the battery cells 20. The hardness and the material of the outer frame-forming elastic member 131 are the same as those of the first embodiment.

The shape of the inner frame-forming elastic member 132 is not particularly limited as long as it can be filled with a compressible fluid in a sealed state. The outer shape of the inner frame-forming elastic member 132 may be, for example, spherical, ellipsoidal, or rectangular parallelepiped. The hardness of the inner frame-forming elastic member 132 is not particularly limited, but is preferably lower than that of the outer frame-forming elastic member 131. The hardness and the material of the inner frame-forming elastic member 132 are the same as those of the separating elastic member of the first embodiment.

The compressible fluid 133 is preferably, but not limited to, nitrogen gas from the viewpoint of safety. As the liquid 134, for example, a mineral hydraulic fluid, a phosphate hydraulic fluid, water, or a glycol solvent can be used. The ratio between the compressible fluid 133 filling the interior of the outer frame-forming elastic member 131 and the liquid 134 filling the interior of the inner frame-forming elastic member 132 is in the range of, for example, 5:5 to 9:1 in volume ratio.

(Operation of Buffer)

Figure 8:
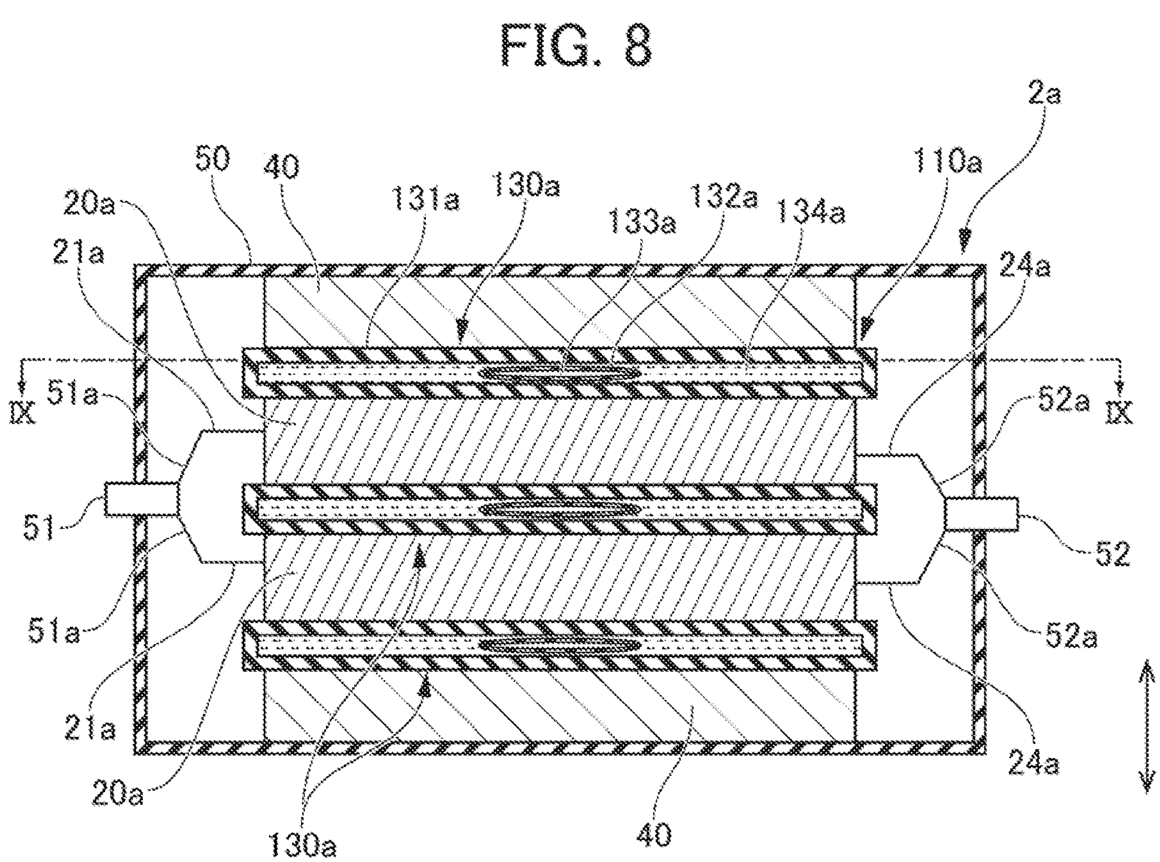
FIG. 8 is a cross-sectional view illustrating a state in which the battery cells in the battery module according to the second embodiment of the present invention have an increased volume.
Figure 9:
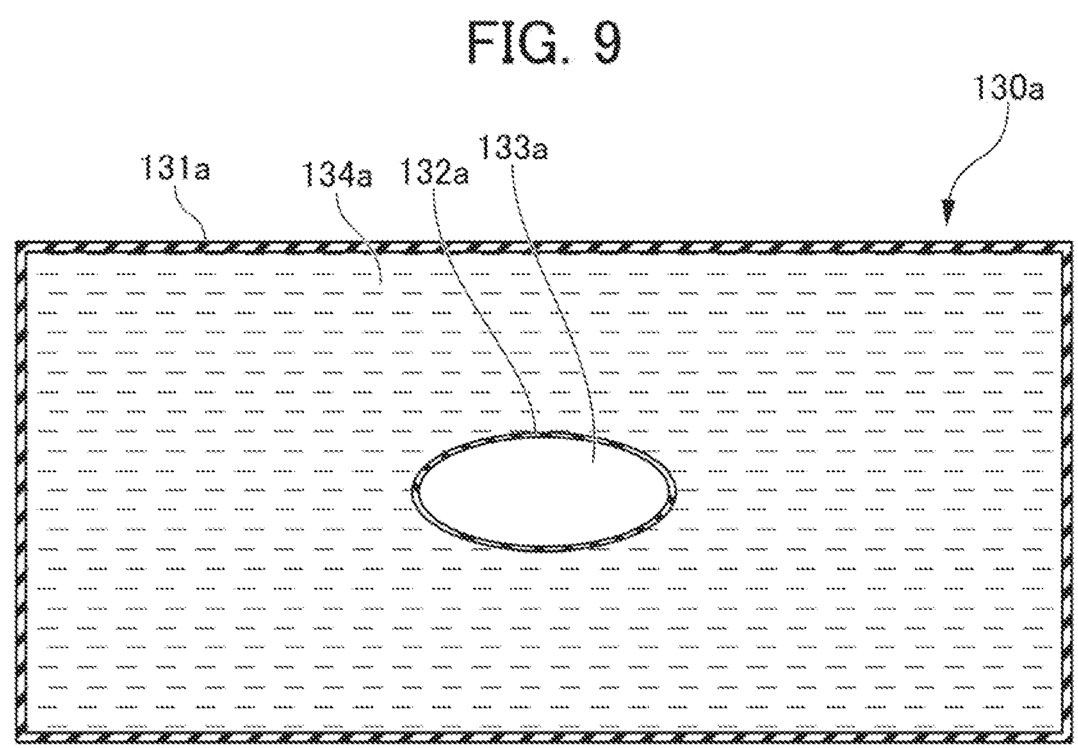
FIG. 9 is a cross-sectional view taken along line IX-IX of FIG. 8.

Next, an operation that the buffers 130 perform when the volume of the battery cells 20 in the battery module 2 increases will be described with reference to FIGS. 8 and 9. As illustrated in FIGS. 8 and 9, in the battery module 2*a* in which the battery cells 20*a* have an increased volume, the buffers 130*a* are pressurized in the stacking direction of the cell stack 110*a* by the battery cells 20*a* having the increased volume, and as a result, the outer frame-forming elastic member 131*a* of each buffer 130*a* is crushed in the stacking direction of the cell stack 110*a* and becomes thin. When the thickness of the outer frame-forming elastic member 131*a* decreases, the pressure of the liquid 134*a* filling the outer frame-forming elastic member 131*a* rises. The liquid 134*a* having the increased pressure pressurizes the inner frame-forming elastic member 132*a* and the outer frame-forming elastic member 131*a* in a direction orthogonal to the stacking direction of the cell stack 110*a*. As a result, the compressible fluid 133*a* is compressed in the direction orthogonal to the stacking direction of the cell stack 110*a*, and the outer frame-forming elastic member 131*a* is expanded in the direction orthogonal to the stacking direction of the cell stack 110*a*.

In a case where the inner frame-forming elastic member 132*a* has a lower hardness and is more deformable than the outer frame-forming elastic member 131*a*, a pressure is easily transmitted to the compressible fluid 133*a* filling the interior of the inner frame-forming elastic member 132*a*. Therefore, the compressible fluid 133*a* tends to be compressed. Since the outer frame-forming elastic member 131*a* is expanded in the direction orthogonal to the stacking direction of the cell stack 110*a* as the compressible fluid 133*a* is compressed, an increase in the surface pressure due to the excessive compression of the compressible fluid 133*a* is alleviated.

In the battery module 2 of the present embodiment having the configuration described above, when the volume of the battery cells 20 increases, the compressible fluid 133 is compressed in a direction orthogonal to the stacking direction of the cell stack 110*a* due to the pressure applied by the liquid 134 filling the outer frame-forming elastic member 131, and the outer frame-forming elastic member 131 is expanded in the direction orthogonal to the stacking direction of the cell stack 110*a*, whereby the buffer 130 contracts in the stacking direction of the cell stack 110*a*. The compressible fluid 133 that has been compressed and the outer frame-forming elastic member 131 that has been expanded tend to recover their original shapes in response to release from the pressure applied by the liquid 134. Therefore, when the battery cells 20 contract, the buffers 130 tend to restore their original states. Since the compressible fluid 133 and the liquid 134 both have fluidity, each buffer 130 has a uniform internal pressure. Furthermore, since the compressible fluid 133 fills the interior of the inner frame-forming elastic member 132, and the liquid 134 fills the exterior of the inner frame-forming elastic member 132, i.e., the compressible fluid 133 is surrounded by the liquid 134, it is unlikely for the compressible fluid 133 to flow to the outside. Therefore, the battery module 2 of the present embodiment can efficiently apply a uniform and constant pressure to the battery cells 20 regardless of whether the battery cells 20 are in the charging state or the discharging state.

In the battery module 2 of the present embodiment, in a case where the inner frame-forming elastic member 132 has a lower hardness than the outer frame-forming elastic member 131, when the inner frame-forming elastic member 132 and the outer frame-forming elastic member 131 are pressurized by the liquid 134, compression of the compressible fluid 133 is more likely to occur than the expansion of the outer frame-forming elastic member 131. When the compressible fluid 133 is apt to be compressed, the internal pressure of the buffer 130, that is, the pressure of the compressible fluid 133 and that of the liquid 34 can be increased. Such an increase in the internal pressure of the buffer 130 makes it easy for the buffer 130 to restore the original shape upon release from the pressure applied by the liquid 134.

In the battery module 2 of the present embodiment, each battery cell 20 may include, as the negative electrode active material layer 23 of the negative electrode layer 21, a lithium metal or a metal that forms an alloy with lithium. Therefore, the electric capacity of each battery cell 20 increases.

In the foregoing, preferred embodiments of the present invention have been described. However, it should be noted that the present invention is not limited to the embodiments described above, and can be modified as appropriate.

In the above embodiments, the battery cell 20 is described as a solid state battery, but the battery cell 20 is not limited thereto. The battery cell 20 may be, for example, a non-aqueous battery including an organic electrolytic solution as an electrolyte, or a polymer battery including a high polymer gel (polymer).

In the above embodiments, the buffers 30, 130 are interposed between the battery cells 20 and between the battery cells 20 and the end plates 40, but the positions of the buffers 30, 130 are not limited thereto. It is only necessary for the buffers 30, 130 to be interposed at least between the battery cells 20 or between the battery cell 20 and the end plate 40.

EXPLANATION OF REFERENCE NUMERALS

1, 1*a*, 2, 2*a*: Battery module
10, 10*a*: Cell stack
20, 20*a*: Battery cell
21: Negative electrode layer
21*a*: Negative electrode terminal
22: Negative electrode current collector
23: Negative electrode active material layer
24: Positive electrode layer
24*a*: Positive electrode terminal
25: Positive electrode current collector
26: Positive electrode active material layer

27: Solid electrolyte layer
28: Exterior package
30, 30*a*: Buffer
31, 31*a*: Outer frame-forming elastic member
32, 32*a*: Separating elastic members
33, 33*a*: Compressible fluid
34, 34*a*: Liquid
40: End plate
50: Case
51: Negative electrode tab
51*a*: Lead wire
52: Positive electrode tab
52*a*: Lead wire
110, 110*a*: Cell stack
130, 130*a*: Buffer
131, 131*a*: Outer frame-forming elastic member
132, 132*a*: Inner frame-forming elastic member
133, 133*a*: Compressible fluid
134, 134*a*: Liquid

What is claimed is:

1. A battery module comprising:

a cell stack including a plurality of battery cells that are stacked;

a pair of end plates disposed at opposite ends of the cell stack in a stacking direction of the cell stack; and a buffer interposed at least between the battery cells or between the battery cell and the end plate, the buffer comprising an outer frame-forming elastic member, a separating elastic member disposed to surround a central portion of the outer frame-forming elastic member, a compressible fluid filling an interior of the separating elastic member, and a liquid filling an exterior of the separating elastic member.

2. The battery module according to claim 1, wherein the separating elastic member has a lower hardness than the outer frame-forming elastic member.

3. The battery module according to claim 1, wherein the separating elastic member is disposed obliquely with respect to the stacking direction of the cell stack.

4. The battery module according to claim 1, wherein the plurality of battery cells each comprise: an electrode laminate in which a positive electrode layer and a negative electrode layer are laminated via a solid electrolyte layer; and an exterior package that houses the electrode laminate, the negative electrode layer increases in volume during charge and decreases in volume during discharge, the exterior package is expandable and contractible in a laminating direction of the electrode laminate, and the plurality of battery cells are stacked in the laminating direction of the electrode laminate.

5. A battery module comprising:

a cell stack including a plurality of battery cells that are stacked;

a pair of end plates disposed at opposite ends of the cell stack in a stacking direction of the cell stack; and a buffer interposed at least between the battery cells or between the battery cell and the end plate, the buffer comprising an outer frame-forming elastic member, an inner frame-forming elastic member accommodated inside the outer frame-forming elastic member, a compressible fluid filling the inner frame-forming elastic member, and a liquid filling a space between the outer frame-forming elastic member and the inner frame-forming elastic member.

6. The battery module according to claim 5, wherein the inner frame-forming elastic member has a lower hardness than the outer frame-forming elastic member.

7. The battery module according to claim 5, wherein the plurality of battery cells each comprise: an electrode laminate in which a positive electrode layer and a negative electrode layer are laminated via a solid electrolyte layer; and an exterior package that houses the electrode laminate, the negative electrode layer increases in volume during charge and decreases in volume during discharge, the exterior package is expandable and contractible in a laminating direction of the electrode laminate, and the plurality of battery cells are stacked in the laminating direction of the electrode laminate.

* * * * *